(12) United States Patent
Ptacek et al.

(10) Patent No.: US 9,013,898 B2
(45) Date of Patent: Apr. 21, 2015

(54) SYNCHRONOUS RECTIFIER CONTROLLER, POWER CONVERTER USING SAME, AND METHOD THEREFOR

(71) Applicants: Karel Ptacek, Roznov Pod Radhostem (CZ); Roman Stuler, Karolinka (CZ)

(72) Inventors: Karel Ptacek, Roznov Pod Radhostem (CZ); Roman Stuler, Karolinka (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 267 days.

(21) Appl. No.: 13/624,626

(22) Filed: Sep. 21, 2012

(65) Prior Publication Data

US 2014/0085952 A1 Mar. 27, 2014

(51) Int. Cl.
*H02M 3/335* (2006.01)
*H02M 1/00* (2006.01)
*H02M 1/08* (2006.01)

(52) U.S. Cl.
CPC .......... *H02M 3/335* (2013.01); *H02M 3/33592* (2013.01); *H02M 2001/0054* (2013.01); *H02M 1/08* (2013.01)

(58) Field of Classification Search
CPC ............. H02M 2001/0048; H02M 2001/0051; H02M 2001/0054
USPC .................................. 363/127, 21.08, 21.14
See application file for complete search history.

(56) References Cited

U.S. PATENT DOCUMENTS

| | | | |
|---|---|---|---|
| 6,271,712 B1 | 8/2001 | Ball | |
| 6,992,906 B1 * | 1/2006 | Herbert | 363/127 |
| 8,067,928 B2 * | 11/2011 | Nakamura et al. | 323/283 |
| 2006/0119332 A1 * | 6/2006 | Elbanhawy | 323/273 |
| 2008/0061757 A1 * | 3/2008 | Khayat et al. | 323/283 |
| 2008/0258697 A1 * | 10/2008 | Gehrke | 323/283 |
| 2008/0265683 A1 * | 10/2008 | Zhu et al. | 307/80 |
| 2009/0153111 A1 * | 6/2009 | Mao et al. | 323/272 |

OTHER PUBLICATIONS

Semiconductor Components Industries, LLC.; "Secondary Side Synchronous Rectification Driver for High Efficiency SMPS Topologies"; Product Data Sheet; Jun. 2011; 30 Pages; NCP4303A, NCP4303B, NCP4303/D, Rev. 4; Semiconductor Components Industries, LLC, P.O. Box 5163, Denver, CO 80217 U.S.A.

NXP Semiconductors, B.V.; "GreenChip synchronous rectifier controller"; Product Data Sheet; Jun. 7, 2010; 12 Pages; TEA1791T, Rev. 02; NXP Semiconductors B.V., 411 E. Plumeria Drive, San Jose, CA 95134, USA.

* cited by examiner

*Primary Examiner* — Harry Behm
(74) *Attorney, Agent, or Firm* — Polansky & Associates, P.L.L.C.; Paul J. Polansky

(57) ABSTRACT

In one form, a synchronous rectifier controller includes a drive clamp adjust terminal, a drive terminal, a clamp voltage generator circuit coupled to the drive clamp adjust terminal for measuring a signal at the drive clamp adjust terminal and providing a clamp voltage having a value determined by the signal, and a driver for providing a drive signal to the drive terminal at a voltage related to the clamp voltage during an active period of the drive signal. In an alternate form a power converter includes a rectifier transistor having a first current electrode, a control electrode for receiving a drive signal, and a second current electrode, and a synchronous rectifier controller having a first terminal coupled to the control electrode of the rectifier transistor for providing the drive signal alternately in an active state and an inactive state.

12 Claims, 7 Drawing Sheets

SYNCHRONOUS RECTIFIER CONTROLLER, POWER CONVERTER USING SAME, AND METHOD THEREFOR

FIELD OF THE DISCLOSURE

The present disclosure relates generally to power converters, and more particularly relates to power converters with synchronous rectifiers.

BACKGROUND

Synchronous rectifiers provide an efficient way of generating the required low operating voltages and high currents for electronic devices such as power supplies for laptop computers. Synchronous rectifiers are used in a variety of topologies, including forward converters, flyback converters, buck converters, push-pull converters, and half-bridge converters, inductor-inductor-capacitor (LLC) converters, and the like. For example in an LLC flyback converter employing a synchronous rectifier, a power transistor replaces a secondary side diode to obtain a lower on-state voltage drop. The synchronous rectifier uses a metal-oxide-semiconductor field effect transistor (MOSFET) rather than a diode to avoid the turn on voltage drop of a diode, which can decrease converter efficiency. For example, an N-channel MOSFET synchronous rectifier is biased to conduct from source-to-drain when a diode would have been conducting from anode to cathode, and conversely, is made nonconductive to block voltage from drain-to-source when a diode would have been blocking from cathode to anode. To decrease on resistance, the MOSFET is made large, which increases the energy required to charge and discharge the gate.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
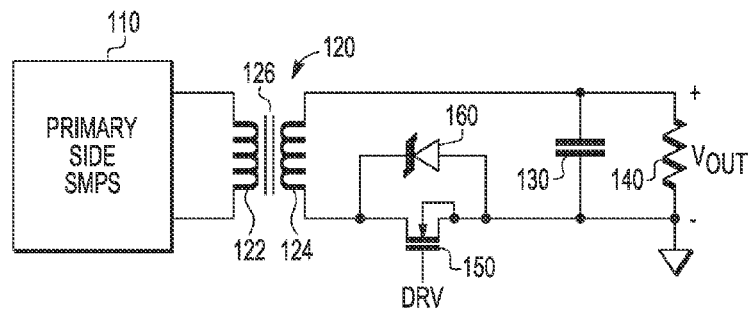
FIG. 1 illustrates in partial block diagram and partial schematic form a synchronous rectifier converter known in the prior art.

FIG. 1 illustrates in partial block diagram and partial schematic form a synchronous rectifier converter 100 known in the prior art. Synchronous rectifier converter 100 generally includes a primary side SMPS 110, a transformer 120, a capacitor 130, a load 140, a transistor 150, and a diode 160 which is a Schottky diode, but could be also a body diode of transistor 150.

Primary side SMPS 110 has a first output terminal and a second output terminal. Transformer 120 includes a primary winding 122, a secondary winding 124, and a core 126. Primary winding 122 has a first terminal connected to the first output terminal of primary side SMPS 110 and a second terminal connected to the second output terminal of primary side SMPS 110. Secondary winding 124 has a first terminal and a second terminal.

Capacitor 130 has a first terminal connected to the first terminal of secondary winding 124 and a second terminal connected to ground. Load 140 has a first terminal connected to the first terminal of secondary winding 124 and a second terminal connected to ground.

Transistor 150 has a control electrode to receive a drive voltage labeled "DRV", a first current electrode connected to ground, a second current electrode connected to the second terminal of secondary winding 124, and a bulk electrode connected to ground. Diode 160 has an anode connected to ground and a cathode connected to the second terminal of secondary winding 124.

In operation, primary side SMPS 110 controls the conduction of current from an input voltage source through the primary of transformer 120 to regulate an output voltage, labeled "$V_{OUT}$", appearing across load 140. When primary side SMPS 110 conducts current through primary winding 122, the increasing current (di/dt>0) creates magnetic flux in core 126 which tends to induce current in secondary winding 124. Secondary winding 124 develops a positive voltage between its second terminal and its first terminal. Rectifier transistor 150 is off, and energy builds in secondary winding 124. During this phase, capacitor 130 maintains $V_{OUT}$ by providing current into load 140. When primary side SMPS 110 stops the conduction of current through primary 122, the decreasing current (di/dt<0) reverses the polarity of secondary winding 124 and causes the voltage on the second terminal of secondary winding 124 to fall below ground. Rectifier transistor 150 turns on, allowing current to flow through secondary winding 124 into capacitor 130 and load 140.

A synchronous rectifier controller, not shown in FIG. 1, turns transistor 150 on and off based on the polarity of the inductor in secondary winding 124. Transistor 150 has a low on resistance, and the voltage drop across transistor 150 is smaller than for a diode, allowing the converter to operate with greater efficiency. However to achieve the low on resistance, transistor 150 must be large and converter 100 requires a significant amount of energy to charge and discharge the gate of transistor 150.

Figure 2:
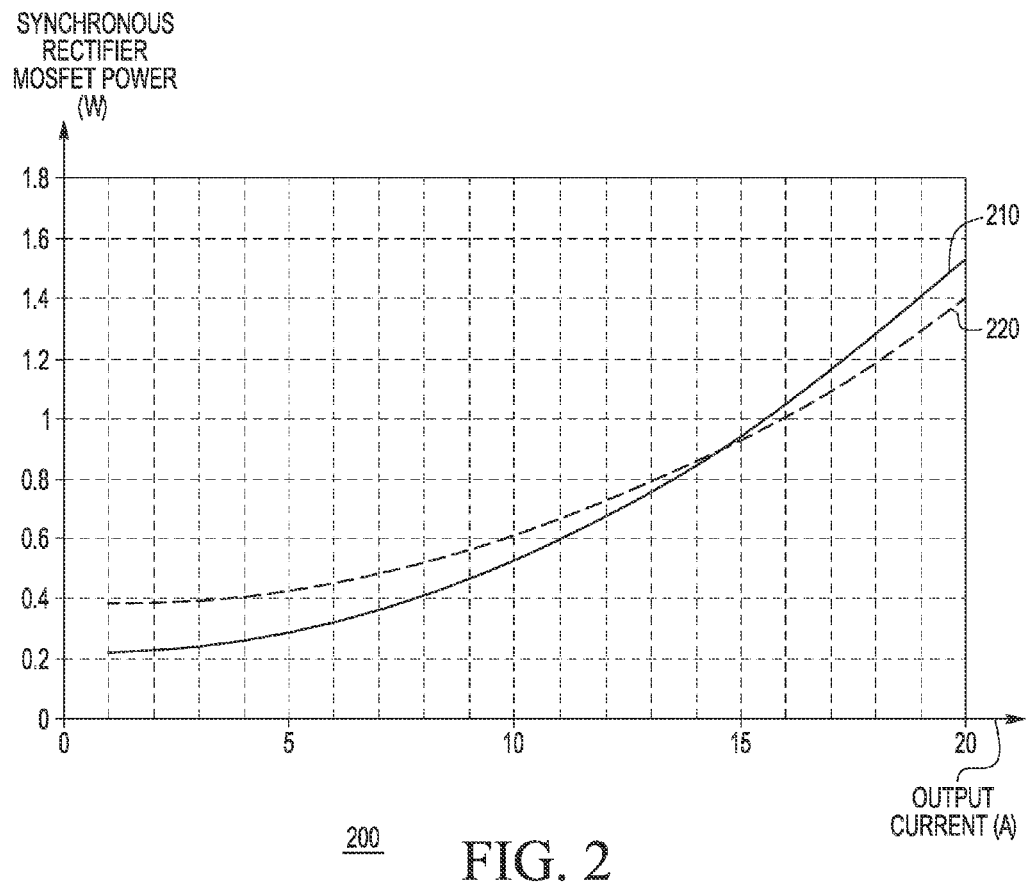
FIG. 2 illustrates a graph useful in understanding the synchronous rectifier converter of FIG. 1.

FIG. 2 illustrates a graph 200 useful in understanding synchronous rectifier controller 100 of FIG. 1. The horizontal axis represents output current of the load in amperes (A), from 0 A to 20 A, and the vertical axis represents power consumed by the synchronous rectifier MOSFET (losses to the system) in watts (W), from 0 W to 1.8 W. A point of interest is at 14 A on the horizontal axis and around 0.9 W on the vertical axis.

In operation, waveform 210 represents power consumption versus current for the synchronous rectifier MOSFET using a first DRV voltage and waveform 220 represents power consumption versus current for the synchronous rectifier MOSFET using a second, higher DRV voltage. Waveform 210 represents a DRV voltage of 6 volts, and waveform 220 represents a DRV voltage of 12 volts, applied to a commercially available SR MOSFET, in an LLC flyback converter.

The inventors discovered that they could increase the efficiency of the synchronous rectifier converter if they could vary the active voltage level of the DRV signal. Converter 100 consumes a significant amount of power charging and discharging the gate of transistor 150, decreasing the converter efficiency, especially for light load conditions. At around 0.9 W, when the output current is less than 14 A (medium and light value of load 140), a lower voltage on the control electrode provides more efficient overall power management of the synchronous rectifier MO SFET.

Figure 3:
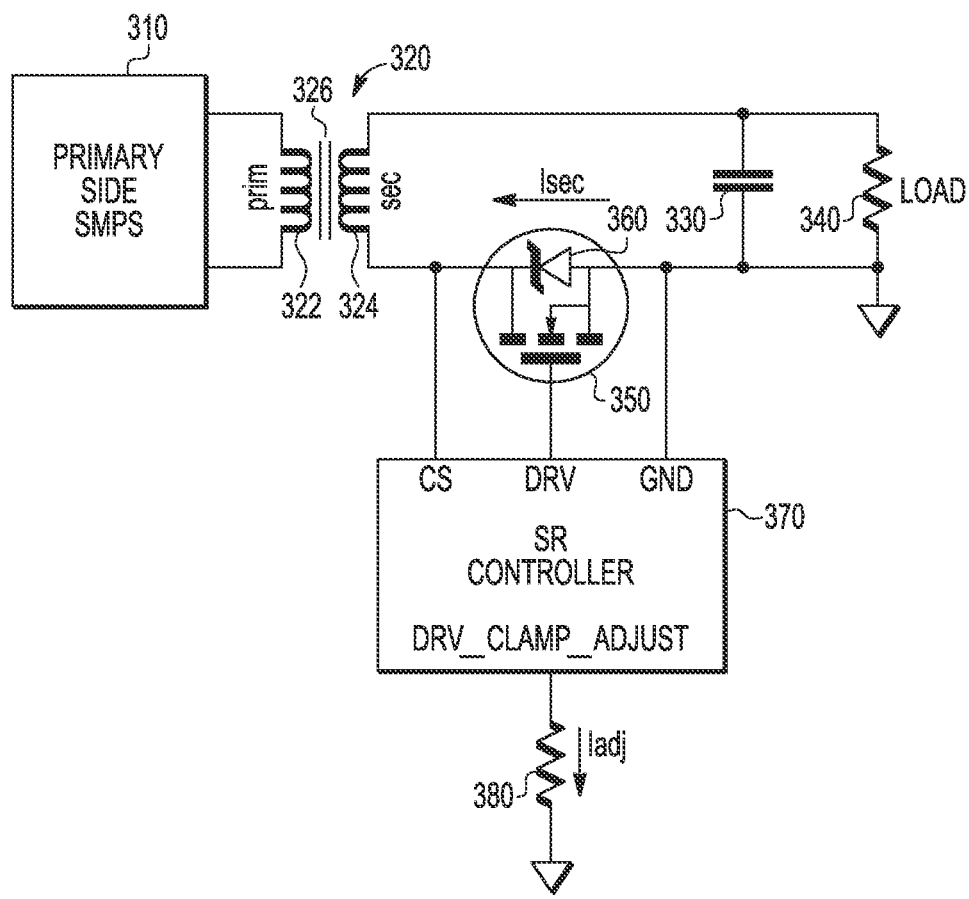
FIG. 3 illustrates in partial block diagram and partial schematic form a power converter including a synchronous rectifier controller according to one embodiment of the present invention.

FIG. 3 illustrates in partial block diagram and partial schematic form a power converter 300 including a synchronous rectifier controller 370 according to one embodiment of the present invention. Power converter 300 generally includes a primary side SMPS 310, a transformer 320, a capacitor 330, a load 340, a rectifier transistor 350, including a body diode 360, synchronous rectifier controller 370, and a resistor 380.

Primary side SMPS 310 has a first output terminal and a second output terminal. Transformer 320 includes a primary winding 322 labeled "prim", a secondary winding 324 labeled "sec", and a core 326. Primary winding 322 has a first terminal connected to the first output terminal of primary side SMPS 310 and a second terminal connected to the second output terminal of primary side SMPS 310. Secondary winding 324 has a first terminal and a second terminal.

Capacitor 330 has a first terminal connected to the first terminal of secondary winding 324 and a second terminal connected to ground. Load 340 has a first terminal connected to the first terminal of secondary winding 324 and a second terminal connected to ground.

Rectifier transistor 350 has a control electrode, a first current electrode connected to ground, a second current electrode connected to the second terminal of secondary winding 324, and a bulk electrode connected to ground. Diode 360 has an anode connected to the first current electrode of rectifier transistor 350 and a cathode connected to the second current electrode of rectifier transistor 350. In other embodiments, a whole synchronous rectification system including rectifier transistor 350 and controller 370 could be connected in a floating configuration, such as by connecting it on the positive side of load 340.

Synchronous rectifier controller 370 has an input terminal labeled "CS" connected to the second terminal of secondary winding 324, an output terminal labeled "DRV" to provide a drive voltage to the control electrode of rectifier transistor 350, a ground terminal labeled "GND", and an output terminal labeled "DRV_CLAMP_ADJUST" to provide a current labeled "Iadj". Resistor 380 has a first terminal connected to the DRV_CLAMP_ADJUST output terminal and a second terminal connected to ground.

In operation, primary side SMPS 310 regulates the voltage across load 340 by controlling the flow of current through primary winding 322, as in synchronous rectifier 100 of FIG. 1. However unlike synchronous rectifier 100, controller 370 allows the voltage of the DRV signal to be varied according to the application. Controller 370 regulates the voltage on the DRV_CLAMP_ADJUST terminal and measures the current flowing out of it. Power converter 300 uses static programming with resistor 380 to determine the level of Iadj and hence the active level of DRV. The static programming of power converter 300 is useful, for example, for applications which tend to operate with medium and light loads.

Figure 4:
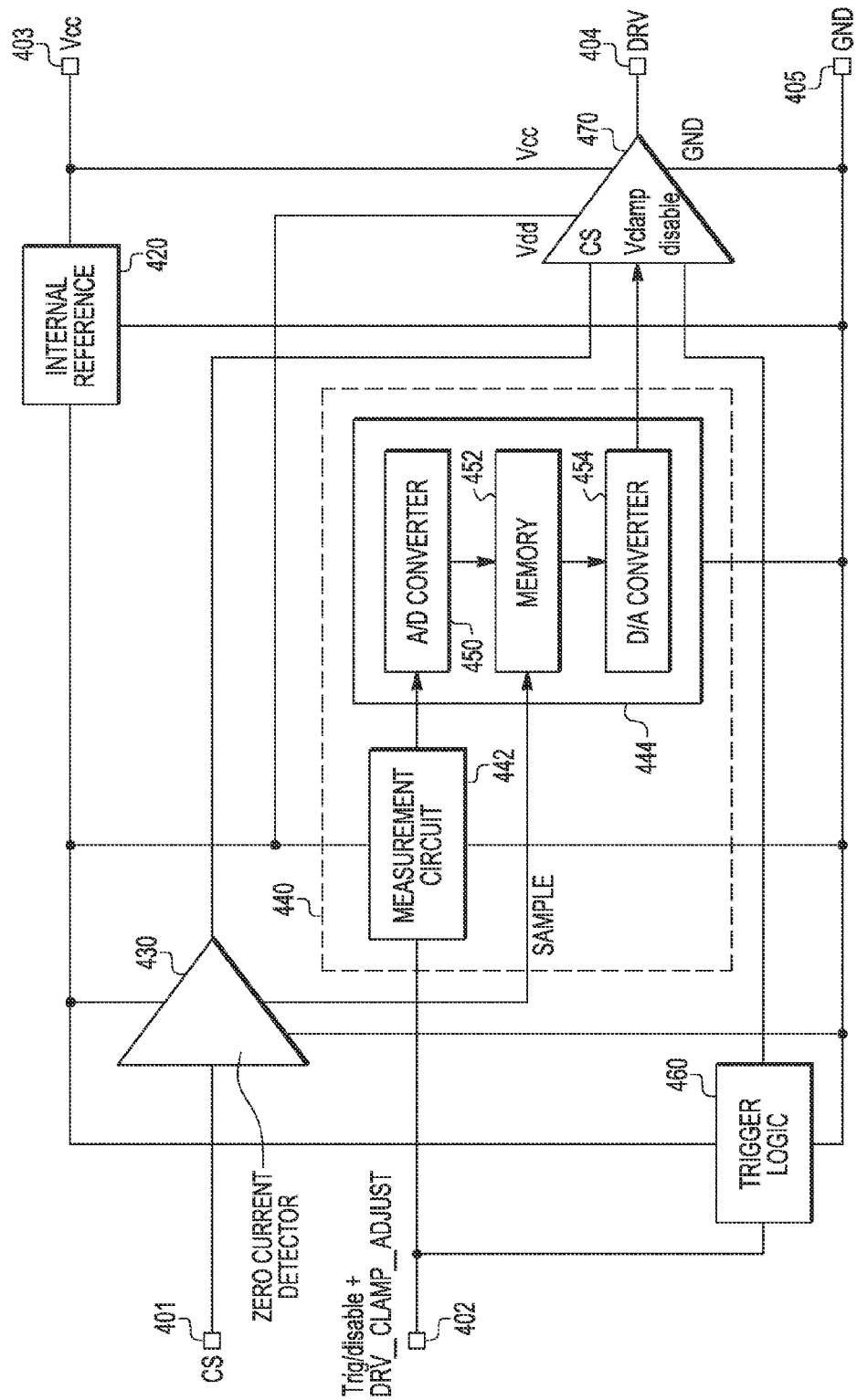
FIG. 4 illustrates in partial block diagram and partial schematic form the synchronous rectifier controller of FIG. 3.

FIG. 4 illustrates in partial block diagram and partial schematic form synchronous rectifier controller 370 of FIG. 3. Synchronous rectifier controller 370 generally includes a current sense (CS) terminal 401, a drive clamp adjust terminal 402 labeled "Trig/disable+DRV_CLAMP_ADJUST", a power supply terminal 403 labeled "$V_{CC}$", a drive (DRV) terminal 404, a ground (GND) terminal 405, an internal reference 420, a phase detect circuit 430, a clamp voltage generator circuit 440, a trigger logic circuit 460, and a driver 470.

Internal reference 420 has an output to provide a reference voltage, an input connected to ground terminal 405, and an input connected to power supply terminal 403. Phase detect circuit 430 has an input connected to current sense terminal 401, an input to receive the reference voltage from internal reference 420, an input connected to ground terminal 405, an output to provide a signal labeled "sample", and an output to provide a current sense signal.

Clamp voltage generator circuit 440 includes a measurement circuit 442 and a sample and hold circuit 444. Measurement circuit 442 has an input connected to drive clamp adjust terminal 402, and an output. Sample and hold circuit 444 includes an analog-to-digital converter 450, a memory 452, and a digital-to-analog converter 454. Analog-to-digital converter 450 has an input connected to the output of measurement circuit 442, and an output. Memory 452 has a first input connected to the output of analog-to-digital converter 450, an second input to receive the sample signal, and an output. Digital-to-analog converter 454 has an input connected to the output of memory 452, and an output to provide a clamp voltage. In sample and hold circuit 444, A/D converter 450 and D/A converter 454 are multi-bit converters.

Trigger logic circuit 460 has an input connected to drive clamp adjust terminal 402, an input to receive the reference voltage from internal reference 420, an input connected to ground terminal 405, and an output to provide a disable signal.

Driver 470 has a current sense (CS) input to receive the current sense signal from phase detect circuit 430, an input labeled "Vclamp" to receive the clamp voltage from digital-to-analog converter 454, a disable input to receive the disable signal from trigger logic circuit 460, an input labeled "Vdd" to receive the reference voltage from internal reference 420, a Vcc input connected to power supply terminal 403, a GND input connected to ground terminal 405, and an output connected to drive terminal 404.

In operation, depending on a particular application, the system provides a wide range of Vcc voltages to power supply terminal 403 of synchronous rectifier controller 370. Internal reference 420 provides a stable reference voltage to internal circuits of synchronous rectifier controller 370. For example, phase detect circuit 430, clamp voltage generator circuit 440, trigger logic circuit 460, and driver 470 provide sensitive measurement, detection, and voltage generation functions. Internal reference 420 provides a stable voltage over a wide range of load demands, power supply fluctuations, and temperature variations. Internal reference 420 provides a stable power supply for internal circuits. Internal reference 420 also provides control for power management of driver 470, and provides the reference voltage for precise generation of the desired clamp voltage provided at drive terminal 404.

During the active period of the drive signal, when rectifier transistor 350 is in the on-state, phase detect circuit 430 provides an active signal to the CS terminal of driver 470 while detecting a certain value of current flowing through rectifier transistor 350 on current sense terminal 401. Also, clamp voltage generator circuit 440 provides a clamp voltage to the Vclamp terminal of driver 470 having a value determined by a signal measured during the inactive period of the drive signal. For example, clamp voltage generator circuit 440 measures the Iadj current signal flowing through resistor

380. Driver 470 drives rectifier transistor 350 on by providing a drive signal to the DRV terminal at a voltage related to the clamp voltage.

During a certain time of the active period, on the CS terminal, phase detect circuit 430 detects substantially zero current flowing through rectifier transistor 350 and provides an inactive signal to the CS terminal of driver 470. Driver 470 provides the drive voltage to the DRV terminal in an inactive state to switch rectifier transistor 350 off.

Alternately, system control logic provides an active disable signal above a defined trigger threshold voltage on drive clamp adjust terminal 402, for example, to enter a standby mode or a power management mode. Trigger logic 460 responds to the active disable signal rapidly to provide the active disable signal to driver 470. Driver 470 provides the drive voltage to the DRV terminal in an inactive state to switch rectifier transistor 350 off.

In the inactive period, a delay after detecting substantially zero current from current sense terminal 401, phase detect circuit 430 provides an active sample signal to clamp voltage generator circuit 440. Clamp voltage generator circuit 440 measures a signal at drive clamp adjust terminal 402 a certain time after driver 470 drives the gate of rectifier transistor 350 in the inactive state and while driver 470 drives the gate of rectifier transistor 350 in the inactive state. Clamp voltage generator circuit 440 regulates the voltage on drive clamp adjust terminal 402 while measuring the current into the terminal to determine the clamp voltage.

Clamp voltage generator circuit 440 further measures the signal at drive clamp adjust terminal 402 when phase detect circuit 430 provides an active sample signal to sample and hold circuit 444. Measurement circuit 442 generally includes a voltage regulator to provide a regulated voltage level below the trigger threshold. Measurement circuit 442 provides a voltage on its output terminal to analog-to-digital converter 450 proportional to a current flowing out of drive clamp adjust terminal 402. Analog-to-digital converter 450 converts the voltage to a certain code, for example a binary code, and provides the code to memory 452 (the "sample" of sample and hold circuit 444). Phase detect circuit 430 provides an active sample signal to memory 452 and memory 452 dynamically stores the updated code at each active sample signal, for each cycle of the inactive period of the drive signal (the "hold" of sample and hold circuit 444). Digital-to-analog converter 454 converts the code to the clamp voltage and provides the clamp voltage to the Vclamp of driver 470.

By operating sample and hold circuitry to dynamically store updated codes at each active sample signal, to provide a precise clamp voltage on the output driver terminal on a cycle-by-cycle basis, the synchronous rectifier controller precisely provides the drive signal as a function of a measured signal that reflects the characteristics of the load. By sharing the trigger function and the drive clamp adjust function on the same terminal, and by measuring the drive clamp adjust function during the inactive period of the drive signal, the synchronous rectifier controller is implemented in a competitive low pin count integrated circuit.

Figure 5:
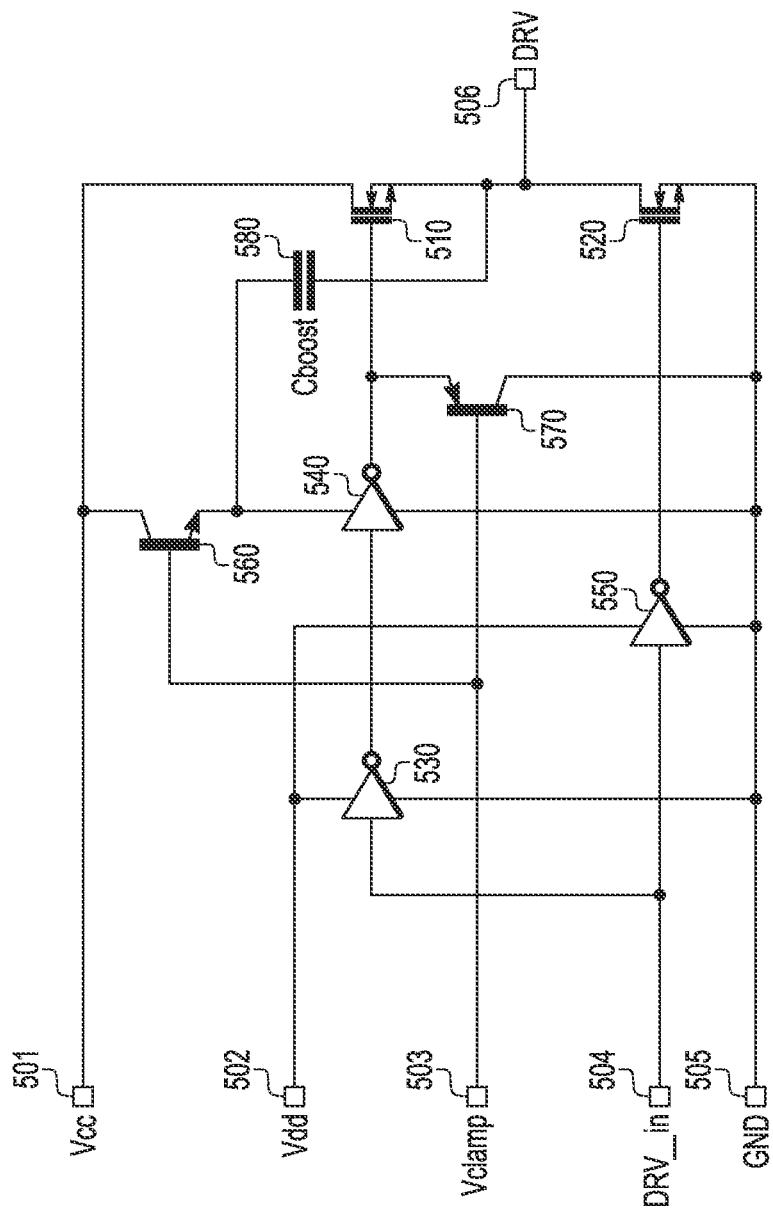
FIG. 5 illustrates in schematic form the driver of FIG. 4.

FIG. 5 illustrates in schematic form driver 470 of FIG. 4. Driver 470 generally includes a power supply (Vcc) terminal 501, a reference voltage (Vdd) terminal 502, a clamp voltage (Vclamp) terminal 503, a drive input terminal 504 labeled "DRV in", a ground (GND) terminal 505, a drive (DRV) terminal 506, a transistor 510 which is a MOSFET, a transistor 520 which is a MOSFET, an inverter 530, an inverter 540, an inverter 550, a transistor 560 which is an NPN bipolar transistor defined as a semiconductor having a P-doped layer between two N-doped layers, a transistor 570 which is a PNP bipolar transistor defined as a semiconductor having an N-doped layer between two P-doped layers, and a capacitor 580 labeled "Cboost".

Transistor 510 has a gate electrode, a drain electrode connected to power supply terminal 501, a source electrode connected to drive terminal 506, and a bulk electrode connected to the source electrode. Transistor 520 has a gate electrode, a drain electrode connected to drive terminal 506, a source electrode connected to ground terminal 505, and a bulk electrode connected to ground terminal 505. Inverter 530 has an input connected to drive input terminal 504, an input connected to reference voltage terminal 502, an input connected to ground terminal 505, and an output. Inverter 540 has an input connected to the output of inverter 530, an input to receive power, an input connected to ground terminal 505, and an output connected to the gate electrode of transistor 510. Inverter 550 has an input connected to drive input terminal 504, an input connected to reference voltage terminal 502, an input connected to ground terminal 505, and an output connected to the gate electrode of transistor 520. Transistor 560 has a base electrode connected to clamp voltage terminal 503, a collector electrode connected to power supply terminal 501, and an emitter electrode to provide the power to inverter 540. Transistor 570 has a base electrode connected to clamp voltage terminal 503, a collector electrode connected to ground terminal 505, and an emitter electrode connected to the output of inverter 540. Capacitor 580 has a first terminal connected to the emitter electrode of transistor 560, and a second terminal connected to drive terminal 506.

In operation, internal reference 420 provides a positive reference voltage to reference voltage terminal 502. During the inactive period, phase detect circuit 430 or trigger logic circuit 460 provides a ground reference voltage to drive input terminal 504. Inverter 550 provides the positive reference voltage to transistor 520 to turn on transistor 520. Inverter 530 provides the positive reference voltage to the input of inverter 540 to turn off transistor 510. Driver 470 provides the drive voltage to drive terminal 506 in an inactive state to switch rectifier transistor 350 off.

During the active period, phase detect circuit 430 provides a certain positive voltage to drive input terminal 504. Inverter 550 provides the ground reference voltage to the gate electrode of transistor 520 to turn off transistor 520. Inverter 530 provides the ground reference voltage to the input of inverter 540 and the output of inverter 540 turns on transistor 510. Transistor 510 provides a ramping active voltage on drive terminal 506 which provides a ramping bootstrap voltage on the first terminal of capacitor 580. Capacitor 580 provides the bootstrapped voltage to power inverter 540 to boost the active drive voltage on the gate of transistor 510.

Clamp voltage generator circuit 440 provides a clamp voltage to clamp voltage terminal 503, to the base electrode of transistor 560 and the base electrode of transistor 570. Transistor 560 and transistor 570 operate with inverter 540 to provide a drive signal to drive terminal 506 at a voltage related to the clamp voltage. In particular, capacitor 580 bootstraps the voltage on the first terminal of capacitor 580 to a voltage level that is a function of the clamp voltage on clamp voltage terminal 503 and the voltage across transistor 570. Driver 470 provides the drive voltage to drive terminal 506 in an active state to switch rectifier transistor 350 on. Inverter 540 establishes a voltage difference with drive terminal 506 to further clamp drive terminal 506.

By providing bootstrapping circuitry in cooperation with clamping circuitry, driver 470 can provide a precise voltage to the control electrode of the rectifier transistor as a function of the application.

Figure 6:
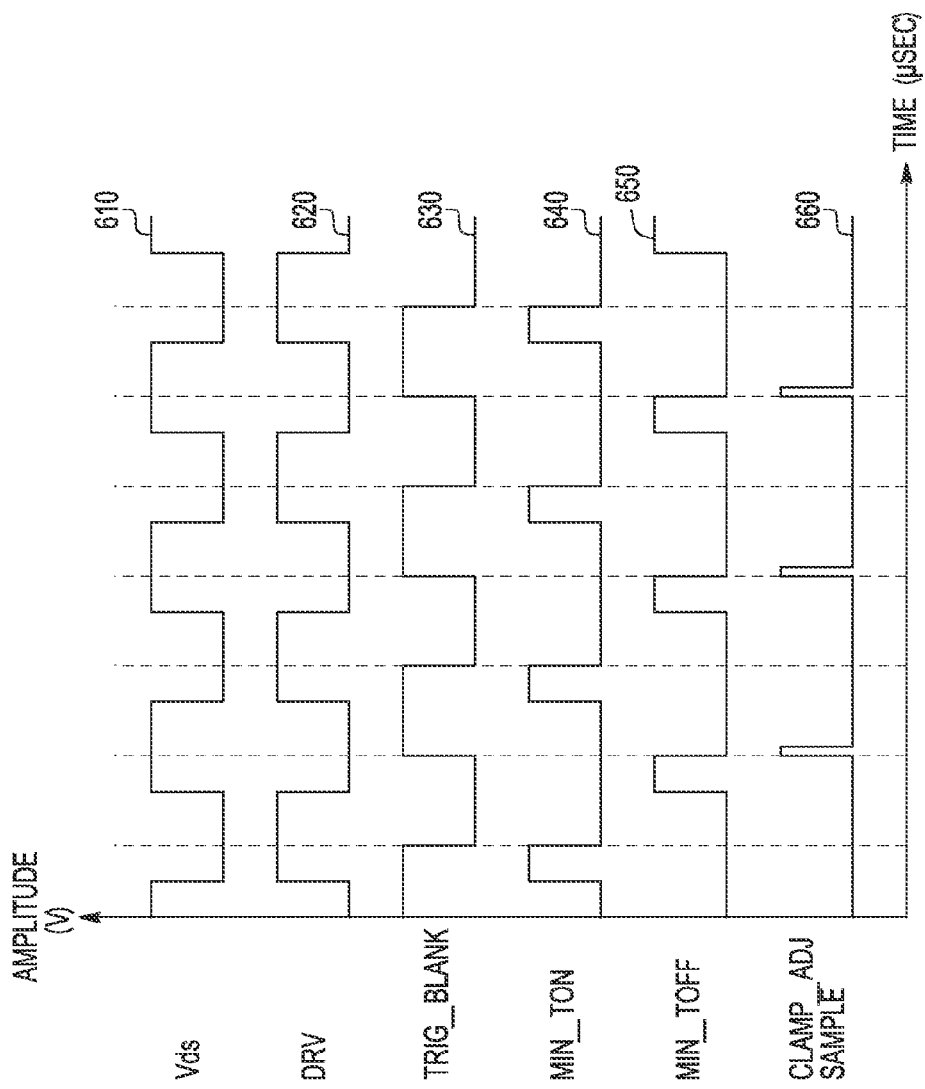
FIG. 6 illustrates a timing diagram useful in understanding the operation of the power converter of FIG. 3.

FIG. 6 illustrates a timing diagram 600 useful in understanding the operation of power converter 300 of FIG. 3. The horizontal axis represents time in micro seconds (μsecs.), and the vertical axis represents amplitude in volts (V). Diagram 600 illustrates six waveforms of interest. Waveform 610 is labeled "Vds", waveform 620 is labeled DRV, waveform 630 is labeled "TRIG_BLANK", waveform 640 is labeled "MIN_TON", waveform 650 is labeled "MIN_TOFF", and waveform 660 is labeled "CLAMP_ADJ_SAMPLE".

In operation, synchronous rectifier controller 370 provides an active voltage on the DRV terminal during the active period of the drive signal and alternately provides an inactive drive voltage on the DRV terminal during an inactive period of the drive signal (waveform 620). The Vds voltage (drain to source voltage across the first current electrode and the second current electrode of rectifier transistor 350) is substantially equal to the ground reference when the control electrode is driven by an active voltage on the DRV terminal (the active period of waveform 620) and the Vds voltage rises to a positive voltage lower than the breakdown voltage of the body diode 360 when the control electrode is driven by an inactive voltage on the DRV terminal (the inactive period of waveform 620). The rising and falling edges of the trigger blank period (waveform 630) are safe guarded by a minimum time on of rectifier transistor 350 (waveform 640) and a minimum time off of rectifier transistor 350 (waveform 650).

For example, when phase detect circuit 430 detects substantially zero current flowing through rectifier transistor 350, synchronous rectifier controller 370 keeps the DRV signal inactive for a minimum off time to provide noise immunity and to prevent controller 370 from falsely turning rectifier transistor 350 on. Also, phase detect circuit 430 provides the sample signal (waveform 660) to clamp voltage generator circuit 440 during the inactive period of the drive signal after waiting at least a minimum off time. Memory 452 stores the code representing the clamp voltage until the next sample cycle. Phase detect circuit 430 provides the sample signal as a short pulse since trigger logic 460 monitors drive clamp adjust terminal 402 as a trigger input during the active period of the drive signal.

Figure 7:
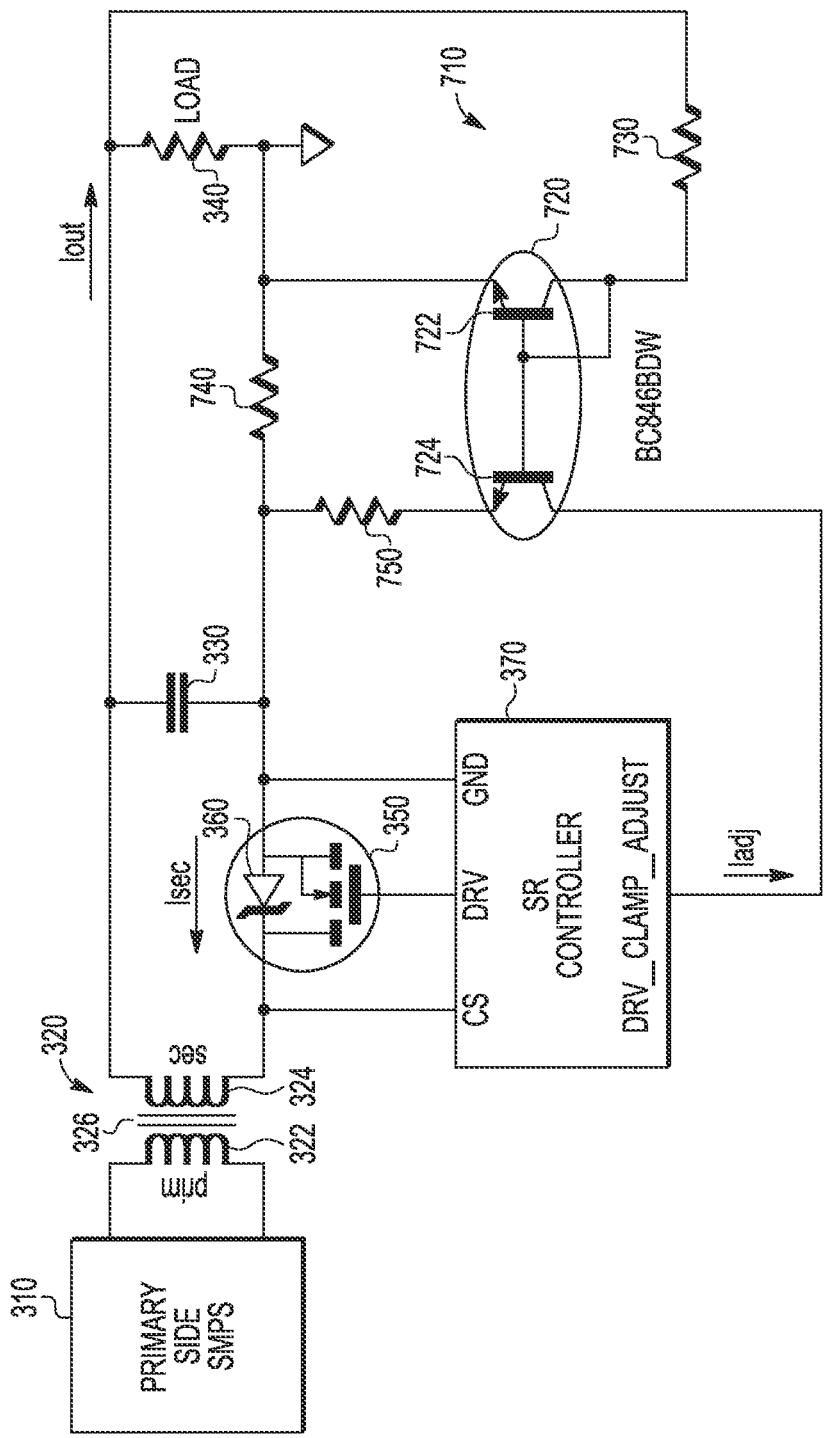
FIG. 7 illustrates in partial block diagram and partial schematic form a power converter according to another embodiment.

FIG. 7 illustrates in partial block diagram and partial schematic form a power converter 700 according to another embodiment. Power converter 700 generally includes primary side SMPS 310, transformer 320, capacitor 330, load 340, rectifier transistor 350 including diode 360, synchronous rectifier controller 370, and variable current source 710.

Capacitor 330 has a first terminal connected to the first terminal of secondary winding 324 and a second terminal connected to the first current electrode of rectifier transistor 350, and the terminal of synchronous rectifier controller 370 labeled GND.

Variable current source 710 includes a pair of matched transistors known as "NPN duals" 720, a resistor 730, a resistor 740, and a resistor 750. NPN duals 720 include a transistor 722 which is an NPN bipolar transistor, and a transistor 724 which is an NPN bipolar transistor. In power converter 700, NPN duals 720 are implemented using, for instance, part number BC846BDW available from ON Semiconductor.

Transistor 722 has a base electrode, a collector electrode connected to the base electrode, and an emitter electrode connected to ground. Transistor 724 has a base electrode connected to the base electrode of transistor 722, a collector electrode to receive the current Iadj, and an emitter electrode.

Resistor 730 has a first terminal connected to the first terminal of secondary winding 324 and a second terminal connected to the common base and collector terminals of transistor 722. Resistor 740 has a first terminal connected to the second terminal of capacitor 330 and a second terminal connected to ground. Resistor 750 has a first terminal connected to the second terminal of capacitor 330 and a second terminal connected to the emitter electrode of transistor 724.

In operation, power converter 700 provides dynamic control of the DRV voltage to allow an improvement in efficiency under light load conditions. Current mirror 720 increases Iadj based on voltage drop across resistor 740, which in turn increases based on Iout and the condition of load 340. If load 340 is in a light load condition, current mirror circuit 710 decreases Iadj to cause SR controller 370 to decrease the DRV voltage to MOSFET 350, and therefore to improve efficiency.

Figure 8:
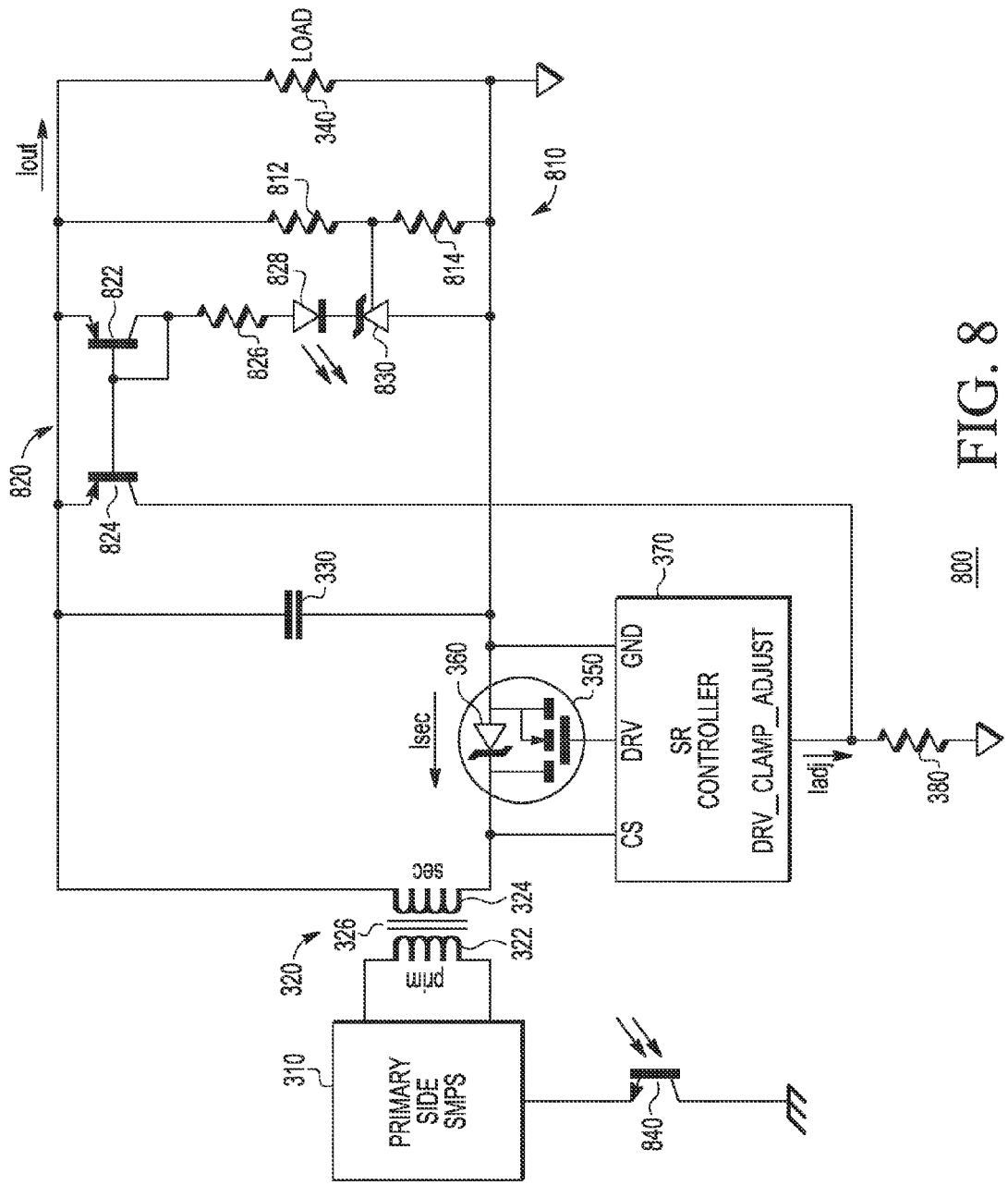
FIG. 8 illustrates in partial block diagram and partial schematic form a power converter according to yet another embodiment.

FIG. 8 illustrates in partial block diagram and partial schematic form a power converter 800 including a synchronous rectifier controller 370 and a feedback regulator 820 according to an alternate embodiment. Power converter 800 generally includes primary side SMPS 310, transformer 320, capacitor 330, load 340, rectifier transistor 350, diode 360, synchronous rectifier controller 370, resistor 380, a bias network 810, a feedback regulator 820, and a phototransistor 840.

Bias network 810 includes a resistor 812 and a resistor 814. Resistor 812 has a first terminal connected to the first terminal of secondary winding 324 and a second terminal. Resistor 814 has a first terminal connected to the second terminal of resistor 812 and a second terminal connected to ground.

Feedback regulator 820 includes a transistor 822 which is a PNP bipolar transistor, a transistor 824 which is a PNP bipolar transistor, a resistor 826, a light emitting diode (LED) 828, a diode 830 which is a programmable zener diode. Transistor 822 has a base electrode connected to a collector electrode, and an emitter electrode connected to the first terminal of secondary winding 324. Transistor 824 has a base electrode connected to the base electrode of transistor 822, a collector electrode connected to the first terminal of resistor 380, and an emitter electrode connected to the first terminal of secondary winding 324. Resistor 826 has a first terminal connected to the common base and collector connection of transistor 822 and a second terminal. LED 828 has an anode connected to the second terminal of resistor 826 and a cathode. Diode 830 has an anode connected to ground, a cathode connected to the cathode of LED 828, and an adjustable output voltage terminal connected to the second terminal of resistor 812.

Phototransistor 840 has a base to receive electrons that are generated by photons, a collector connected to an output of primary side SMPS 310 and an emitter connected to earth ground. An optocoupler is formed by LED 828 and phototransistor 840.

In operation, power converter 800 also provides dynamic control of the DRV voltage to allow an improvement in efficiency under light load conditions, but in addition uses feedback control circuit 810 that would already be present for flyback control. In power converter 800, resistors 812 and 814 form a voltage divider that produces a voltage proportional to the output voltage. This stepped-down voltage controls the breakdown voltage of zener diode 830, which also sets the current through transistor 822, resistor 826, and photodiode 828. Photodiode 828 and phototransistor 840 are part of an optocoupler, and power converter 800 uses them as feedback to control the switching of primary current by primary side SMPS 310. When the voltage across load 340 increases, such as during a light load condition, the voltage developed by resistors 812 and 814 increases, which increases the current through transistor 822. Transistors 822 and 824 are matched PNP duals, and form a current mirror to add a current component to Iadj. Thus the increased current through transistor 824 decreases Iadj to cause SR controller 370 to decrease the DRV voltage of MOSFET 350, and therefore to improve efficiency.

Thus the disclosed synchronous rectifier converter has a synchronous rectifier controller and a rectifier transistor to provide a lower resistance current path for secondary winding 324 to decrease power that would otherwise be lost across diode 360. However, in addition to managing power, synchronous rectifier controller 370 provides the drive signal to control the rectifier transistor as a function of the application, the current flowing through the rectifier transistor, a measured signal, and the characteristics of the load.

The synchronous rectifier controller also provides the drive signal as a function of a generated clamp voltage. Synchronous rectifier controller 370 operates sample and hold circuitry to dynamically store updated codes at each active sample signal, to provide a precise clamp voltage on the output driver terminal on a cycle by cycle basis. Also, by providing bootstrapping circuitry in cooperation with clamping circuitry, the driver output can provide a precise voltage to the control electrode of the rectifier transistor as a function of the application.

By including a circuit such as a current mirror or a feedback regulator, the output current is accurately represented at the drive clamp adjust terminal, and the synchronous rectifier controller precisely provides the drive signal as a function of a measured signal that reflects the characteristics of the load.

By sharing the trigger function and the drive clamp adjust function on the same terminal, and by measuring the drive clamp adjust function during the inactive period of the drive signal, the synchronous rectifier controller is implemented in a competitive low pin count integrated circuit.

The above-disclosed subject matter is to be considered illustrative, and not restrictive, and the appended claims are intended to cover all such modifications, enhancements, and other embodiments that fall within the true scope of the claims.

For example, in the illustrated embodiment, the Iadj current is shown flowing out of the DRV_CLAMP_ADJUST terminal of synchronous rectifier controller 370. In some embodiments, the Iadj current could flow into the DRV_CLAMP_ADJUST terminal, and synchronous rectifier controller 370 could measure other signals such as an adjust voltage value.

In the illustrated embodiment, internal reference 420, phase detect circuit 430, clamp voltage generator circuit 440, trigger logic 460, and driver 470 are combined in a single integrated circuit, but in other embodiments different combinations of these circuits may be integrated together. In addition, MOSFET 350 may be integrated with the other components of controller 370 into a single integrated circuit.

In the illustrated embodiment, variable current source 710 and bias network 810 each represent the Iout current at the DRV_CLAMP_ADJUST terminal of synchronous rectifier controller 370. In some embodiments, other circuits could be used to provide the feedback function and other representations of load 340 could be provided to the DRV_CLAMP_ADJUST terminal, such as the output voltage ("Vout") across load 340. Moreover, the representation signal at the DRV_CLAMP_ADJUST terminal could be in response to the value of a resistor, such as resistor 380.

In the illustrated embodiment, driver 470 has clamping and bootstrapping circuitry connected to transistor 510. In some embodiments, clamping and/or bootstrapping circuitry could also be connected to transistor 520, or could be connected only to transistor 520, or could be connected to neither one of transistors 510 and 520. Also, other circuit configurations could implement the clamping and/or bootstrapping circuitry.

In some embodiments, circuits could selectively compensate for process, voltage, and temperature variations of driver 470.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A synchronous rectifier controller comprising:
    a drive clamp adjust terminal;
    a drive terminal;
    a clamp voltage generator circuit coupled to said drive clamp adjust terminal for measuring a signal at said drive clamp adjust terminal and providing a clamp voltage having a value determined by said signal;
    a driver for providing a drive signal to said drive terminal at a voltage related to said clamp voltage during an active period of said drive signal;
    a phase detect circuit for providing a sample signal during an inactive period of a drive signal, wherein said clamp voltage generator circuit further measures said signal at said drive clamp adjust terminal when said sample signal is active; and
    a current sense terminal, wherein said phase detect circuit is coupled to said current sense terminal and provides said sample signal in response to detecting substantially zero current from said current sense terminal.

2. The synchronous rectifier controller of claim 1 wherein said clamp voltage generator circuit comprises:
    a measurement circuit having an input terminal coupled to said drive clamp adjust terminal, and an output terminal; and
    a sample and hold circuit having an input terminal coupled to said output terminal of said measurement circuit, a control input terminal for receiving a sample signal, and an output terminal for providing said clamp voltage.

3. The synchronous rectifier controller of claim 2 wherein said measurement circuit comprises a voltage regulator for providing a regulated voltage on said drive clamp adjust terminal, and providing a voltage on said output terminal of said measurement circuit proportional to a current flowing into said drive clamp adjust terminal.

4. The synchronous rectifier controller of claim 2 wherein sample and hold circuit comprises:
    an analog-to-digital converter having an input terminal coupled to said output terminal of said measurement circuit, and an output terminal;
    a memory having an input terminal coupled to said output terminal of said analog-to-digital converter, a control input terminal for receiving said sample signal, and an output terminal; and
    a digital-to-analog converter having an input terminal coupled to said output terminal of said memory, and an output terminal for providing said clamp voltage.

5. The synchronous rectifier controller of claim 1 further comprising:
    a trigger logic circuit having an input terminal coupled to said drive clamp adjust terminal, and an output terminal for providing a disable signal,
    wherein said driver is responsive to said disable signal to provide said drive signal at a reference voltage.

6. The synchronous rectifier controller of claim 1 where said clamp voltage generator circuit and said driver are combined in a single integrated circuit.

7. A power converter comprising:
a rectifier transistor having a first current electrode, a control electrode for receiving a drive signal, and a second current electrode;
a synchronous rectifier controller having a first terminal coupled to said control electrode of said rectifier transistor for providing said drive signal alternately in an active state and an inactive state, wherein said synchronous rectifier controller clamps said drive signal in said active state at a voltage determined by a signal at a drive clamp adjust terminal; and
a variable current source having an output terminal coupled to said drive clamp adjust terminal for providing an adjust current proportional to an output current provided to a load.

8. The power converter of claim 7 further comprising:
a transformer having a primary winding, a secondary winding coupled to said synchronous rectifier controller, and a core, said secondary winding having first and second terminals for conducting said output current to a load.

9. A method comprising:
detecting an inactive phase of a drive signal in response to detecting substantially zero current from a current sense terminal;
providing a sample signal in response to detecting said inactive phase of said drive signal;
measuring a drive clamp adjust signal on a drive clamp adjust terminal when said sample signal is active;
developing a clamp voltage in response to said drive clamp adjust signal; and
providing said drive signal to a gate of a rectifier transistor in an active state at a level related to said clamp voltage.

10. The method of claim 9 wherein said measuring comprises:
measuring a current conducted into said drive clamp adjust terminal.

11. The method of claim 9 wherein said measuring comprises:
measuring said drive clamp adjust signal a predetermined time after driving said gate of said rectifier transistor in said inactive phase.

12. The method of claim 9 further comprising:
providing said drive clamp adjust signal to said drive clamp adjust terminal in response to a value of a resistor.

* * * * *